United States Patent
Raymond

(10) Patent No.: US 11,565,770 B2
(45) Date of Patent: Jan. 31, 2023

(54) TENSIONER-FREE DRIVETRAIN ASSEMBLY, BICYCLE, AND METHOD OF MANUFACTURING SAME

(71) Applicant: SMYLES & FITZ LLC, Seattle, WA (US)

(72) Inventor: Myles A. Raymond, Seattle, WA (US)

(73) Assignee: SMYLES & FITZ LLC, Seattle, WA (US)

( * ) Notice: Subject to any disclaimer, the term of this patent is extended or adjusted under 35 U.S.C. 154(b) by 121 days.

(21) Appl. No.: 17/148,798

(22) Filed: Jan. 14, 2021

(65) Prior Publication Data

US 2021/0229776 A1 Jul. 29, 2021

Related U.S. Application Data

(60) Provisional application No. 62/964,867, filed on Jan. 23, 2020.

(51) Int. Cl.
*B62M 9/02* (2006.01)
*B62M 9/16* (2006.01)

(52) U.S. Cl.
CPC .............. *B62M 9/02* (2013.01); *B62M 9/16* (2013.01)

(58) Field of Classification Search
CPC ................................ B62M 9/16; B62M 9/02
USPC ........................................................ 280/261
See application file for complete search history.

(56) References Cited

U.S. PATENT DOCUMENTS 3,121,575 A * 2/1964 Bourgi ................... B62M 9/16
474/135

FOREIGN PATENT DOCUMENTS

CN 109665058 A * 4/2019

OTHER PUBLICATIONS

Schuster, Zachary, "Nationals Bike: Sarah Sturm's Glamorous Tenspeed Hero Specialized Crux Singlespeed," Cyclocross Magazine, Jan. 30, 2019. (20 pages).

* cited by examiner

*Primary Examiner* — Kevin Hurley
*Assistant Examiner* — Hosam Shabara
(74) *Attorney, Agent, or Firm* — Robinson & Cole LLP

(57) ABSTRACT

A drivetrain assembly comprises a bottom bracket shell defining a front axis, a dropout defining a rear axis, a chainstay member attached to the dropout and the bottom bracket shell, a front sprocket and a rear sprocket, and a chain or belt including a bottom section extending from a first contact point between the chain or belt and the front sprocket to a second contact point between the chain or belt and the rear sprocket. The chainstay member fixes the dropout relative to the bottom bracket shell, such that a chainstay length is non-variable, and such that the chain or belt has a predetermined tension defined by a midpoint of the bottom section being vertically displaceable only by a maximum vertical extent within a predetermined range upon application of a predetermined load at the midpoint of the bottom section.

19 Claims, 11 Drawing Sheets

TENSIONER-FREE DRIVETRAIN ASSEMBLY, BICYCLE, AND METHOD OF MANUFACTURING SAME

CROSS-REFERENCE TO RELATED APPLICATION

This application claims the benefit of Provisional U.S. Patent Application Ser. No. 62/964,867 filed on Jan. 23, 2020, the entire content of which is incorporated herein by reference in its entirety for all purposes.

TECHNICAL FIELD

The present disclosure relates to tensioner-free drivetrain assemblies, for example for use in bicycles or other chain or belt-driven vehicles, and methods of manufacturing such assemblies and vehicles.

BACKGROUND INFORMATION

An improperly tensioned bicycle chain can pose significant safety risks. This can be particularly problematic in single-speed bicycles, which typically lack a derailleur. Incorrect chain tension can increase the risk of chain derailment, which can in turn lead to loss of control of the vehicle.

Conventional methods of tensioning the chain on a single-speed bicycle typically involve either a mechanism allowing for variable length between the respective axes of the front and rear sprockets (i.e., a variable chainstay length, using for example a horizontal or sliding dropout, or an eccentric bottom bracket), or an accessory tensioner with variable position applying a force directly on the chain. These conventional tensioning mechanisms heavily rely on the user's ability to properly set the chain tension, and are thus susceptible to leading to incorrect tensioning. Conventional tensioning mechanisms also add to the number of components of the bicycle, thus leading to increased complexity, cost, and risk of mechanical failure.

SUMMARY

A drivetrain assembly is disclosed. The drivetrain assembly comprises a bottom bracket shell having a front through-hole defining a front axis, at least one dropout having a rear through-hole defining a rear axis, at least one chainstay member directly or indirectly attached to the at least one dropout and the bottom bracket shell, a front sprocket rotatably coupled to the front through-hole, a rear sprocket rotatably coupled to the rear through-hole, and a chain or belt extending around and in contact with the front and rear sprockets. The chain or belt includes a bottom section extending from a first contact point between the chain or belt and the front sprocket to a second contact point between the chain or belt and the rear sprocket. The at least one chainstay member fixes the at least one dropout relative to the bottom bracket shell, such that a chainstay length, which is the shortest distance from the front axis to the rear axis, is nonvariable, and such that the chain or belt has a predetermined tension defined by a midpoint of the bottom section being vertically displaceable only by a maximum vertical extent within a predetermined range upon application of a predetermined load at the midpoint of the bottom section.

A process of manufacturing a drivetrain assembly is also disclosed. The process of manufacturing a drivetrain assembly comprises arranging a bottom bracket shell having a front through-hole defining a first axis, at least one dropout having a rear through-hole defining a rear axis, and at least one chainstay member, relative to one another, a chainstay length being defined as the shortest distance from the front axis to the rear axis; rotatably coupling a front sprocket to the front through-hole; rotatably coupling a rear sprocket to the rear through-hole; disposing a chain or belt around and in contact with the front and rear sprockets; adjusting a relative position of the bottom bracket shell, the at least one dropout, and the at least one chainstay member, with respect to one another, to reach a predetermined tension of the chain or belt; and, after the predetermined tension of the chain or belt is reached, welding or bonding, directly or indirectly, the at least one chainstay member to the bottom bracket shell and/or to the at least one dropout, to fix the chainstay length.

BRIEF DESCRIPTION OF THE DRAWINGS

Other features and advantages disclosed herein will become more apparent from the following detailed description of exemplary embodiments when read in conjunction with the attached drawings.

DETAILED DESCRIPTION

Figure 1:
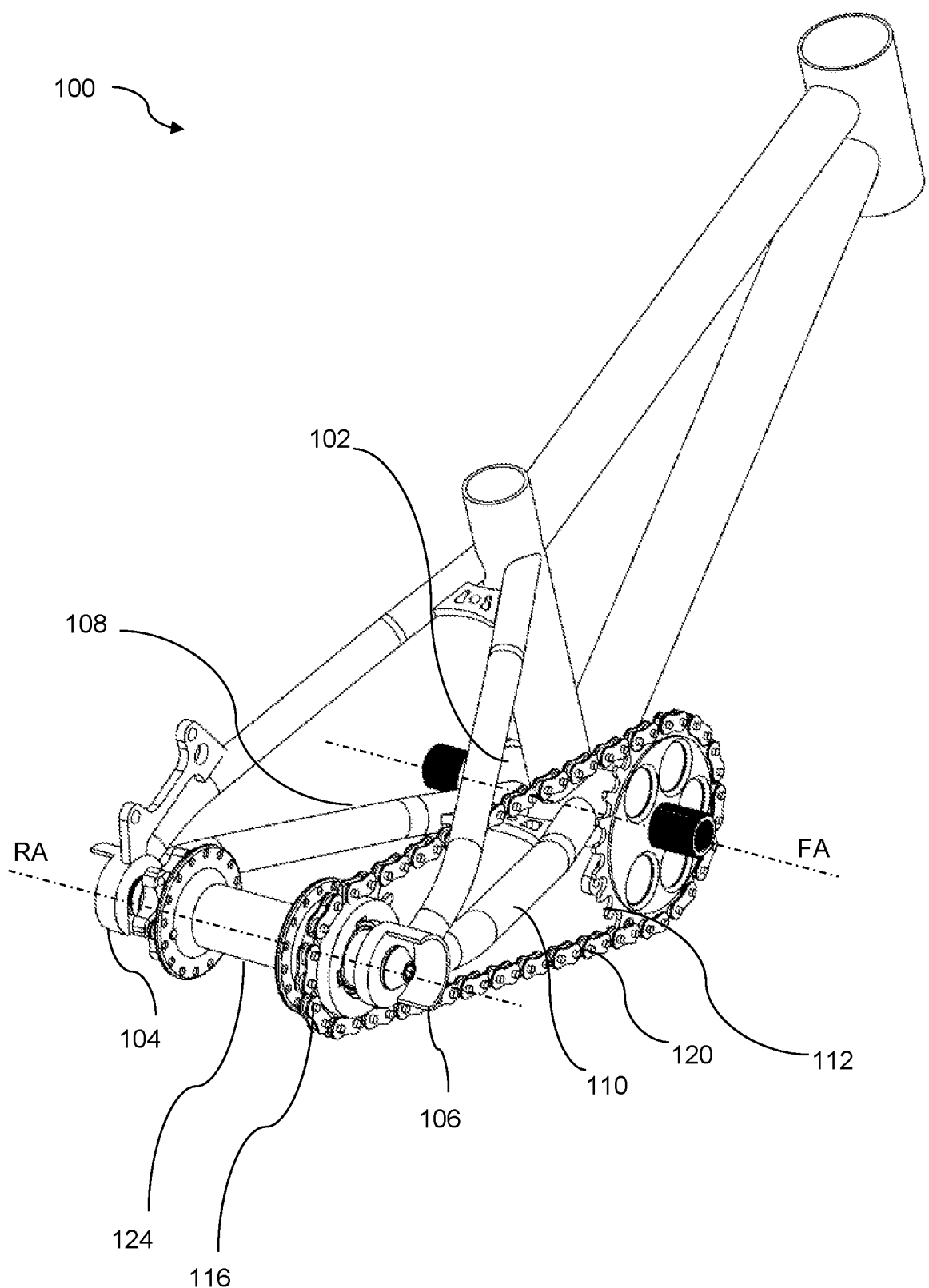
FIG. 1 is a schematic representation of an exemplary embodiment of a drivetrain assembly.

FIG. 1 shows an exemplary embodiment of a drivetrain assembly 100 comprising a bottom bracket shell 102 having a front through-hole defining a front axis FA, a first dropout 104 having a first rear through-hole, and a second dropout 106 having a second rear through-hole). In alternative exemplary embodiments, only a single dropout is provided. The rear through-hole defines a rear axis RA.

The drivetrain assembly 100 further comprises at least one chainstay member 108, 110 directly or indirectly attached to the at least one dropout 104, 106 and the bottom bracket shell 102. For example, a first chainstay member 108 extends from the first dropout 104 to the bottom bracket shell 102, and a second chainstay member 110 extends from the second dropout 106 to the bottom bracket shell 102. Indirect attachment can involve the chainstay member 108, 110 extending from an intermediate component between the chainstay member 108, 110 and the dropout 104, 106, and/or to an intermediate component between the chainstay member 108, 110 and the bottom bracket shell 102.

The drivetrain assembly 100 further comprises a front sprocket 112 rotatably coupled to the front through-hole, and a rear sprocket 116 rotatably coupled to the rear through-hole. In exemplary embodiments, such rotational coupling is effected by an axle coupling. Alternatively, such rotational coupling may involve an internally geared mechanism. In either case, it is preferred that the chain or belt 120 contact a single front sprocket and a single rear sprocket.

The drivetrain assembly 100 further comprises a chain or belt 120 extending around and in contact with the front and rear sprockets 112, 116. As schematically illustrated for example in FIGS. 2A-C, the chain or belt 120 includes a bottom section 122 extending from a first contact point 124 between the chain or belt 120 and the front sprocket 112 to a second contact point 126 between the chain or belt 120 and the rear sprocket 116. The chainstay member 108, 110 fixes the dropout 104, 106 relative to the bottom bracket shell 102, such that the chainstay length, which is the shortest distance from the front axis FA to the rear axis RA, is non-variable, and such that the chain or belt 120 has a predetermined tension defined by a midpoint of the bottom section 122 being vertically displaceable at the midpoint of the bottom section 122 upon application of a predetermined load at the midpoint of the bottom section 122, only by a maximum vertical extent within a predetermined range. In exemplary embodiments, and preferably, the predetermined range is, for a predetermined load of 2 pounds (lbs.): a range from 0.25" to 0.80" for a chainstay length between 6" and 12", and a range from 0.50" to 1.50" for a chainstay length between 12" and 24". Moreover preferably, the predetermined range is, for a predetermined load of 2 pounds (lbs.): a range of 0.30" to 0.50" for a chainstay length between 6" and 9", a range of 0.40" to 0.75" for a chainstay length between 9" and 12", a range of 0.60" to 1.00" for a chainstay length between 12" and 18", and a range of 0.90" to 1.40" for a chainstay length between 18" and 24". This maximum vertical extent can be referred to as slack, and is recognized by ordinarily skilled artisans to be indicative of tension. Proper chain or belt tension is not too tight so as to reduce the risk of creating a load on the sprockets without input from the drive spindle, but not too loose so as to reduce the risk of the chain or belt lifting over sprocket teeth and derail.

Figure 2A:
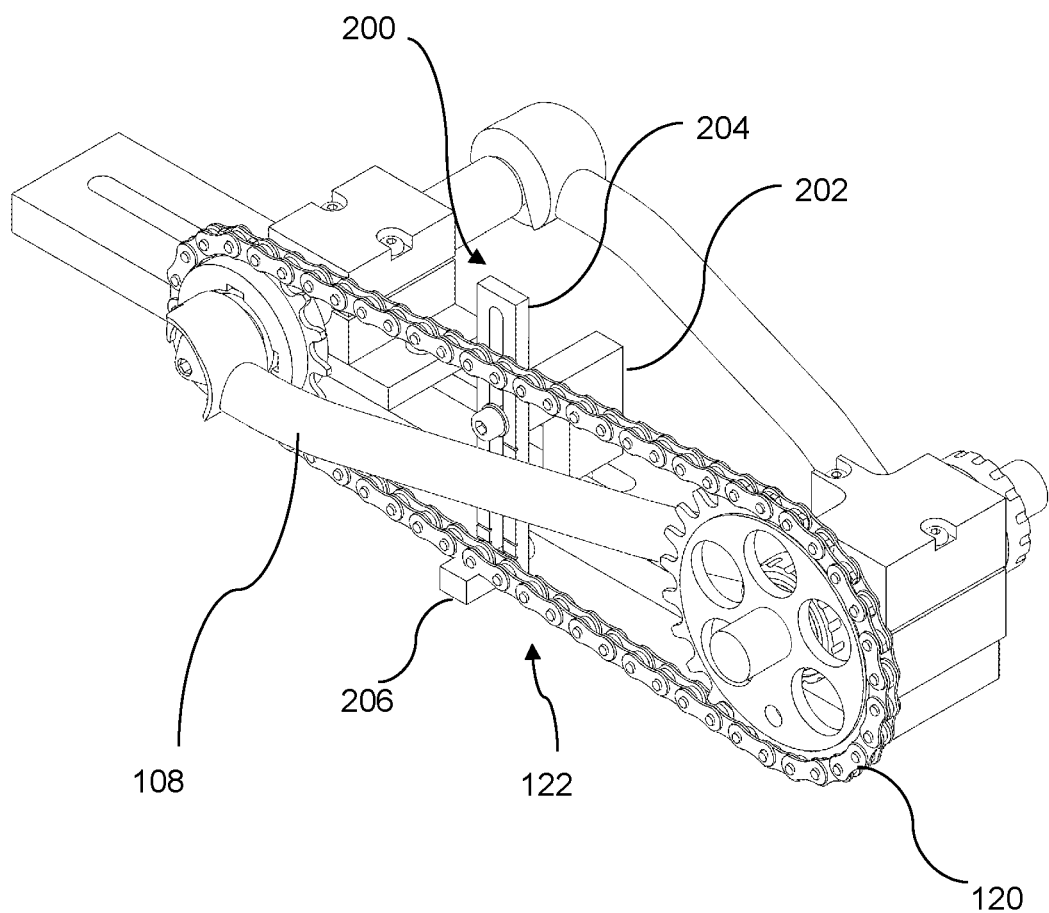
FIGS. 2A-C are schematic representations of a drivetrain assembly illustrating an exemplary measurement process of a predetermined chain or belt tension.
Figure 2B:
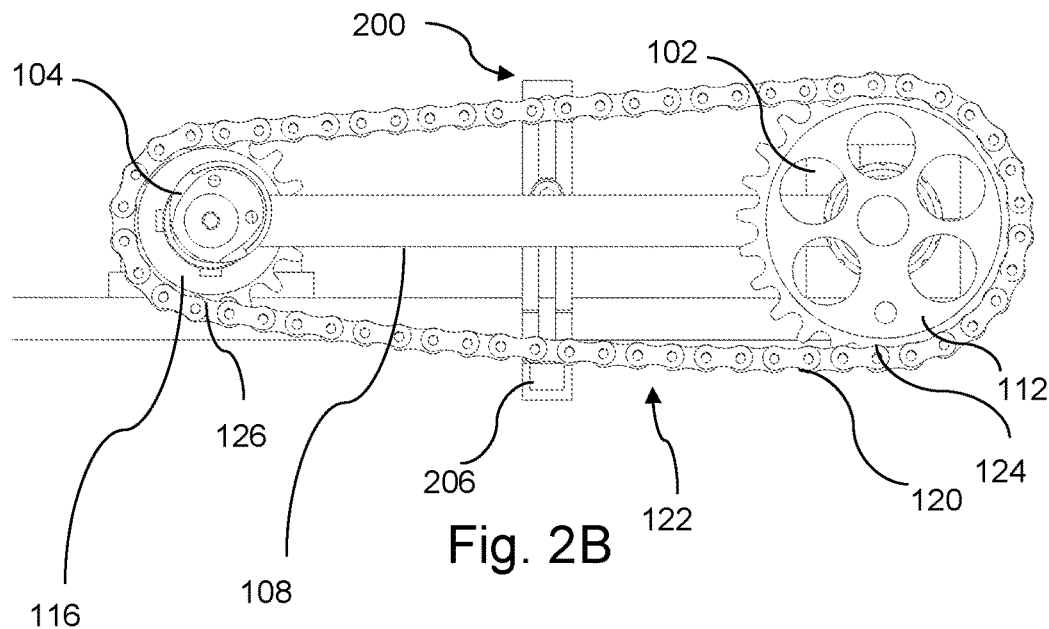
Figure 2C:
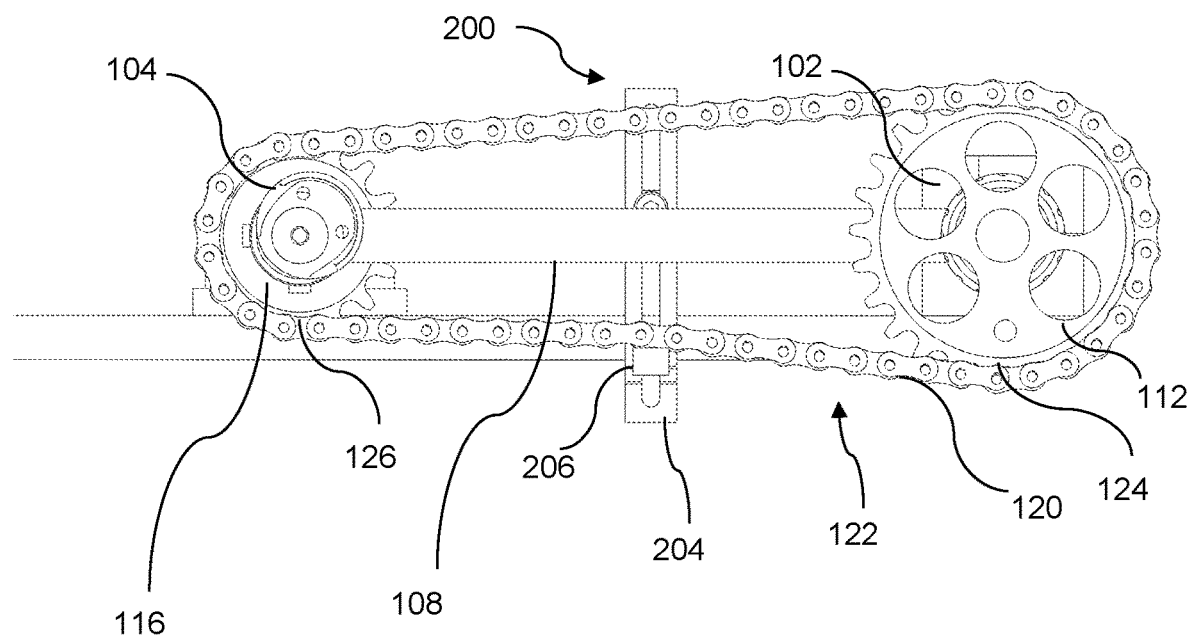

In an exemplary embodiment, as further shown in FIGS. 2A-C, a chain or belt tension measuring device includes a vertical measurement slider 200 including a body portion 202 and first and second sliding portions 204, 206. The body portion 202 is aligned with a midpoint of the chain or belt 120. By sliding the first sliding portion 204, the second sliding portion 206 is brought in contact with the chain or belt 120 at a midpoint of the chain or belt 120, for example at the bottom section 122 (as illustrated in FIG. 2B), although an alternative exemplary second sliding portion 204 may instead contact a midpoint of the chain or belt 120 at its upper section. The first sliding portion 204 is then tightened in place, e.g., using a bolt such as that visible in FIGS. 2A-C. This fixes a "zero" position of the second sliding portion 206. The second sliding portion 206 is then displaced toward the rear-to-front sprocket axis (i.e., upward in FIGS. 2A-C) by application of a predetermined force/load until the chain or belt 120 prevents further movement thereof. To determine the slack measurement, the displacement of the second sliding portion 206 can be determined by measurement marks on the body portion 202 (also illustrated in FIGS. 2A-C). In an exemplary embodiment, measurement marks can be color-coded (e.g., a green region can indicate adequate slack measurement) to facilitate proper tensioning.

In an exemplary embodiment, the drivetrain assembly 100 further comprises a wheel hub 124. In an exemplary embodiment, the first and second dropouts 104, 106 are each integral components (i.e., each monolithically formed of one piece of material) and contact opposite sides of the wheel hub 124. Alternatively, in an exemplary embodiment with a single dropout, the single dropout is integral and contacts one side of the wheel hub 124. Such configurations thus lack, for example, a tensioner mount disposed between a dropout and the wheel hub 124.

In an exemplary embodiment, the chainstay member 108, 110 is metallic, and can thus be welded or bonded, directly or indirectly, to the bottom bracket shell 102 and/or the dropout 104, 106. It is noted that brazing is a type of bonding.

In an exemplary embodiment, any combination of the bottom bracket shell 102, the chainstay member 108, 110, and the dropout 104, 106 are integrally formed together as a single piece. This single piece can be molded from a composite material, 3D printed, or made integrally in any other known method for integrally forming a component.

In an exemplary embodiment, the chain or belt 120 has the predetermined tension while contacting only the front and rear sprockets 112, 116, and a distance between the front axis FA and the rear axis RA is nonadjustable. As such, this configuration advantageously lacks a mechanism allowing for variable chainstay length, such as, for example, a horizontal or sliding dropout, an eccentric bottom bracket, or a chain or belt tension adjuster.

Figure 3:
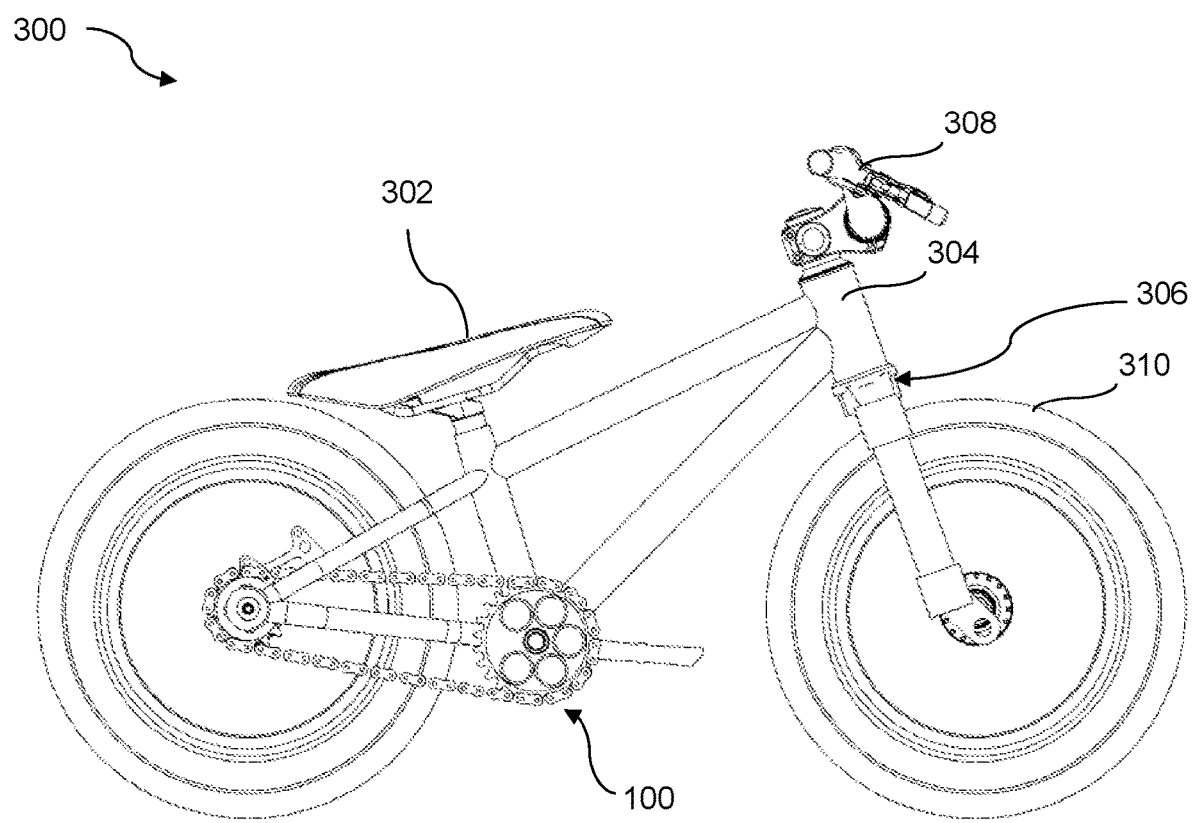
FIG. 3 is a schematic representation of an exemplary embodiment of a bicycle including a drivetrain assembly.

In an exemplary embodiment illustrated in FIG. 3, a bicycle 300 includes the drivetrain assembly 100, a seat 302 indirectly coupled to the drivetrain assembly 100, at least one tubular member 304 coupled to the drivetrain assembly 100, and a front set 306 rotatably coupled to the at least one tubular member 340 and including a handlebar 308 and a front wheel 310.

In an exemplary embodiment, the bicycle 300 is a single-speed bicycle lacking a chain or belt tensioner. In another exemplary embodiment, the bicycle 300 can be a multi-speed bicycle (e.g., internally geared) with only one external front sprocket and only one external rear sprocket, and lacking a chain or belt tensioner. In exemplary embodiments, the bicycle 300 can be pedal-driven and/or driven by a motor (electric, gas, or otherwise powered).

Figure 4A:
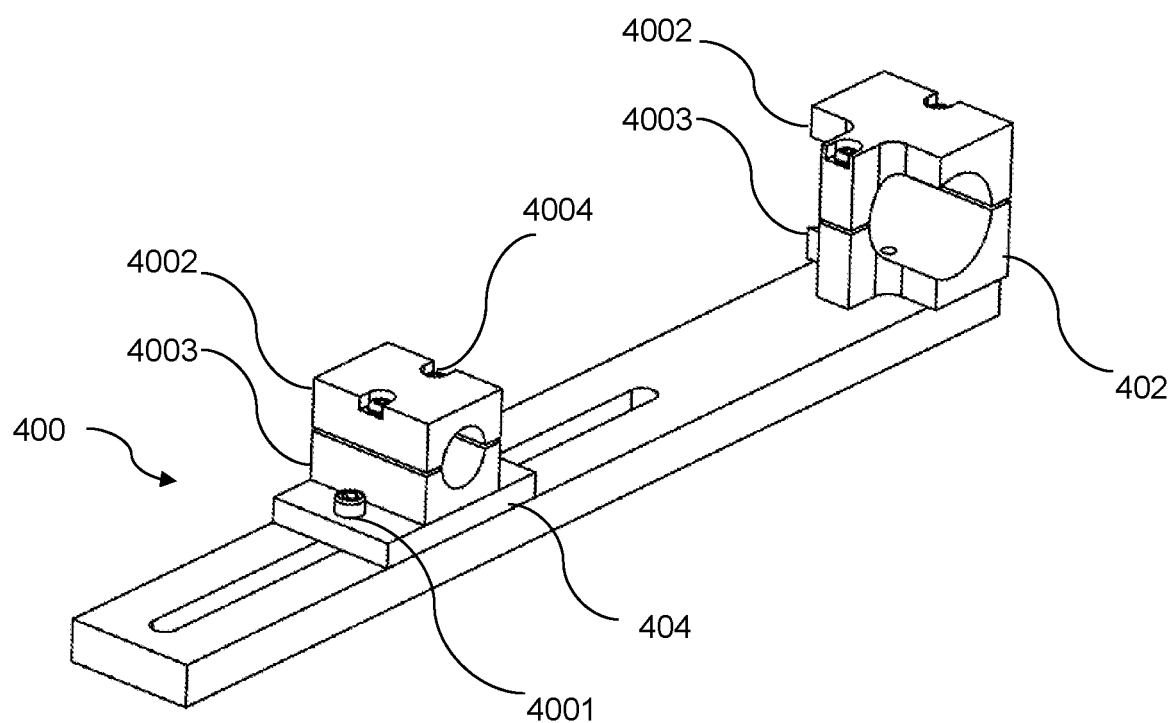
FIGS. 4a-4n are schematic representations of steps of an exemplary process of manufacturing a bicycle frame.
Figure 4B:
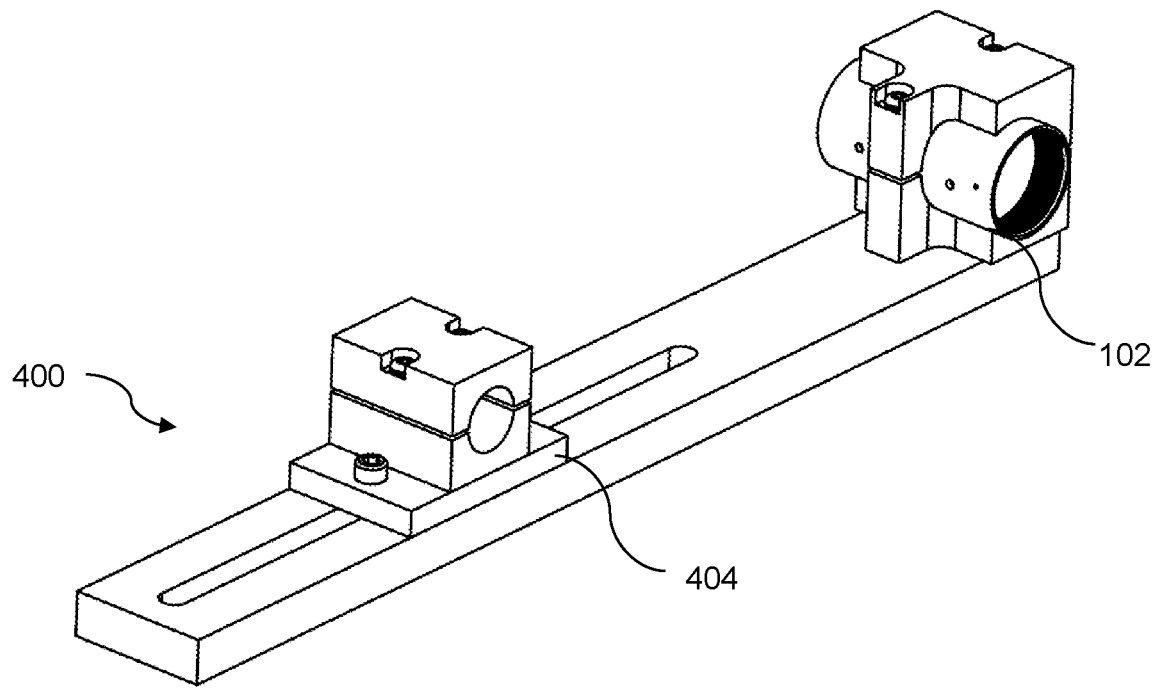
Figure 4C:
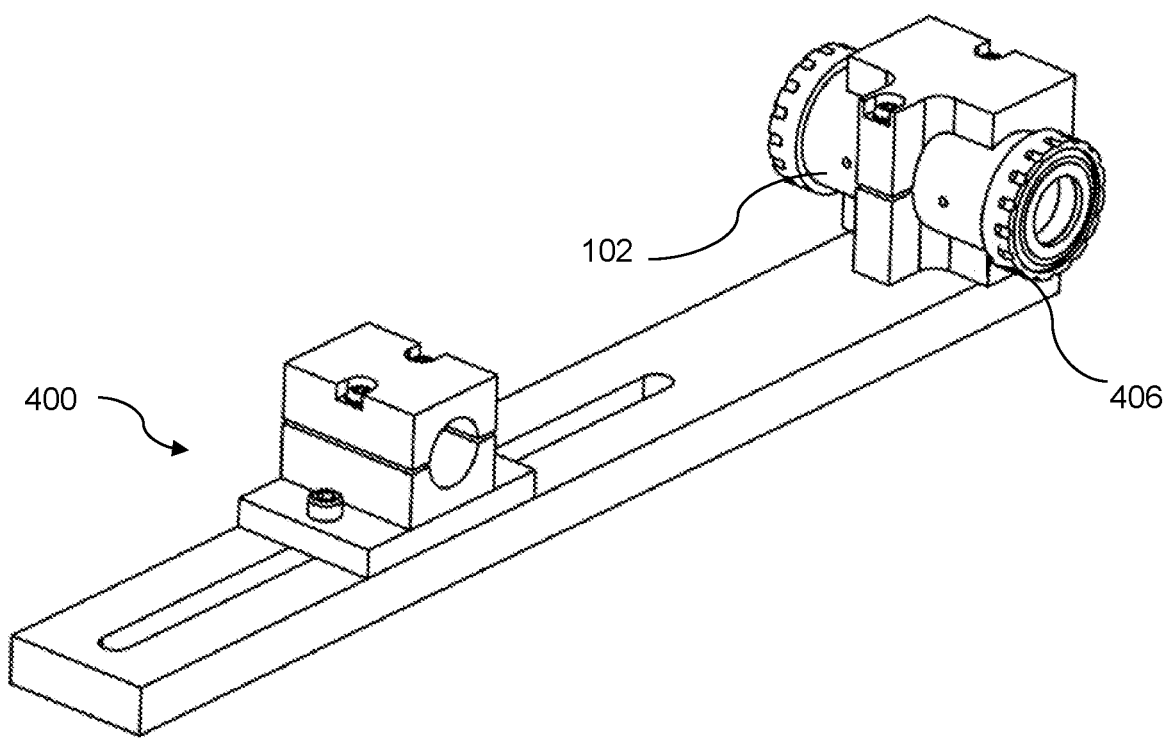
Figure 4D:
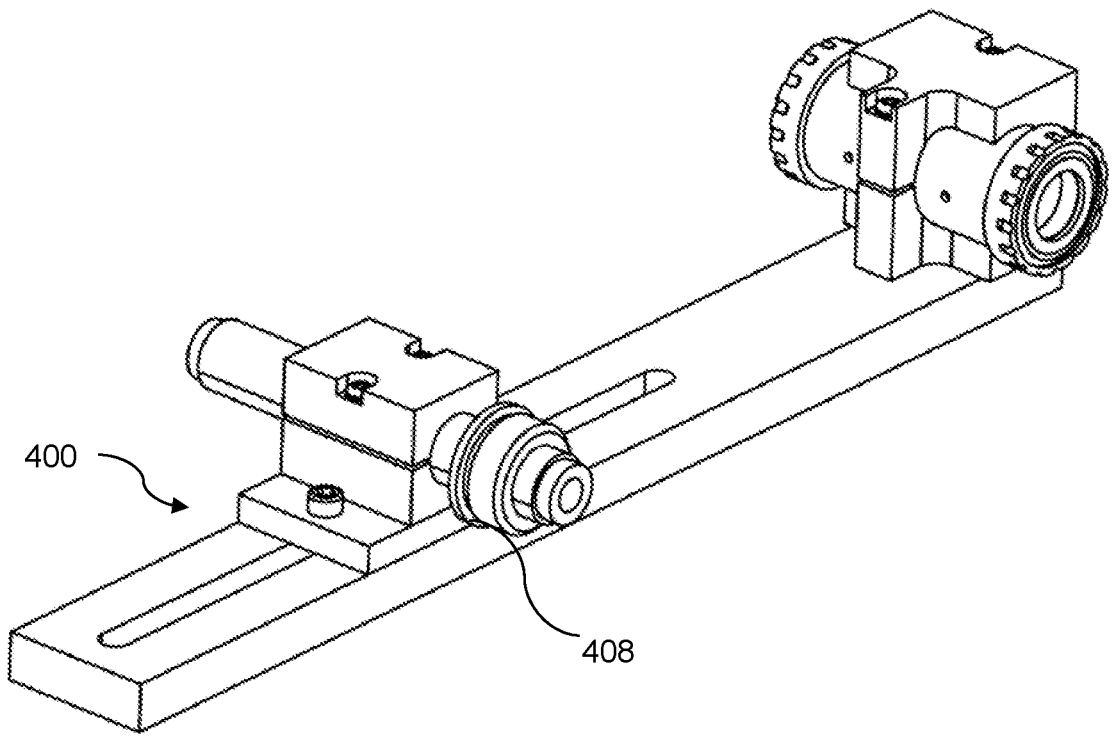
Figure 4E:
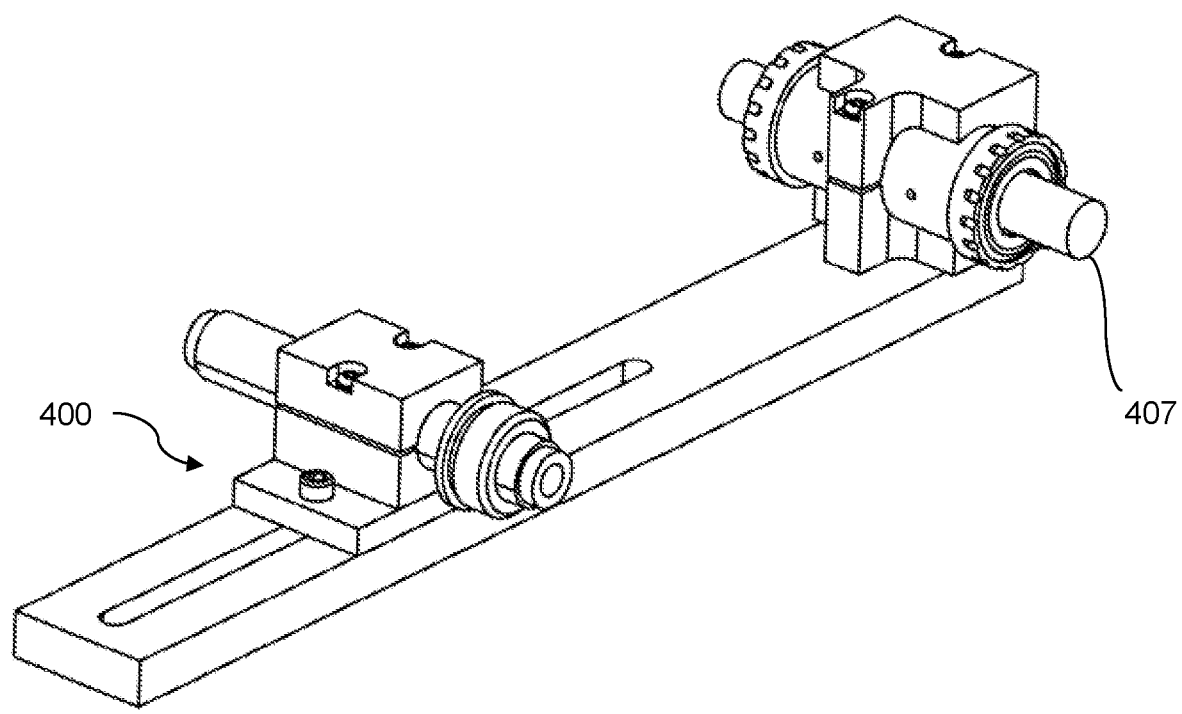
Figure 4F:
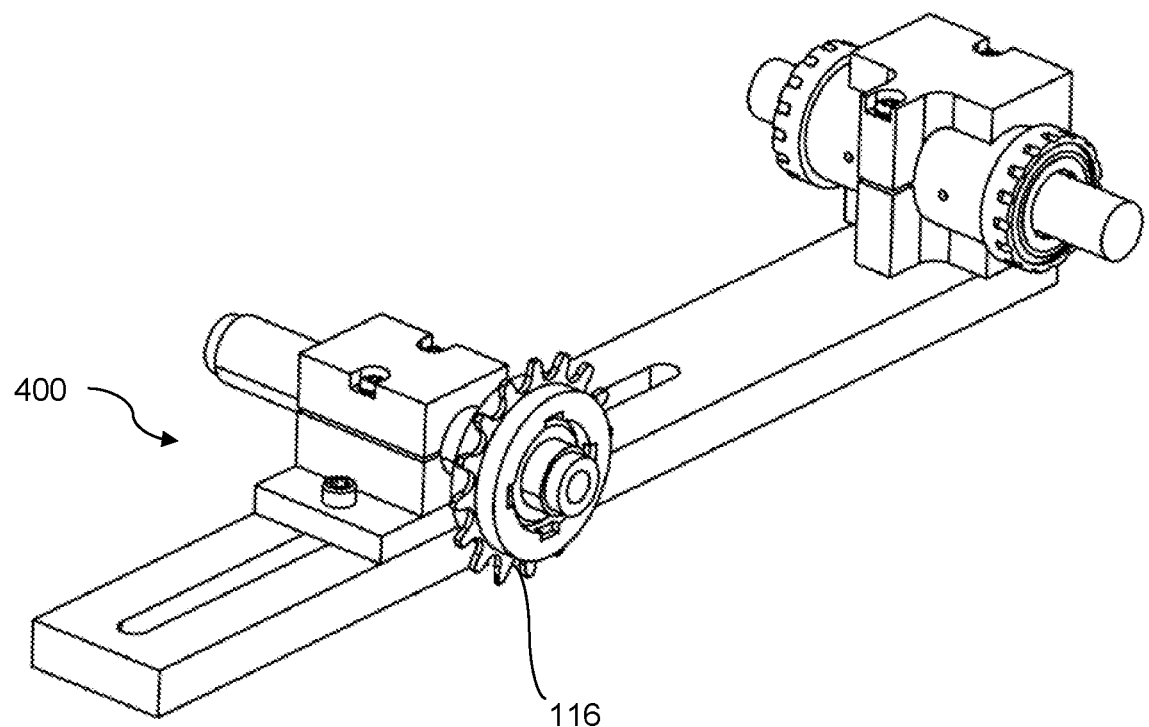
Figure 4G:
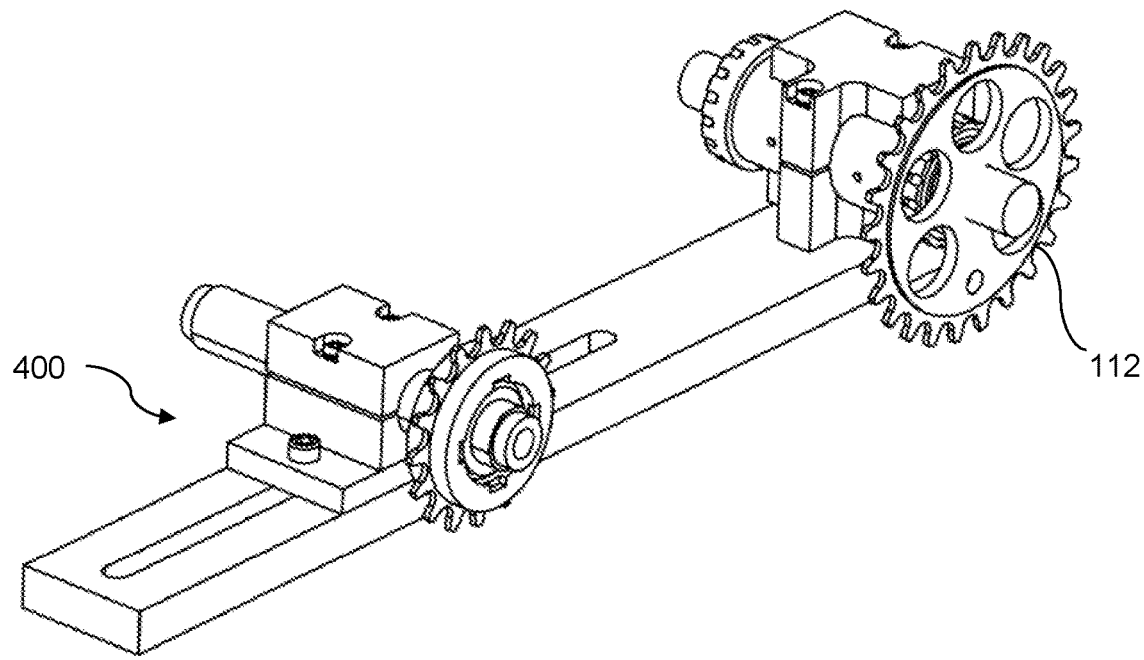
Figure 4H:
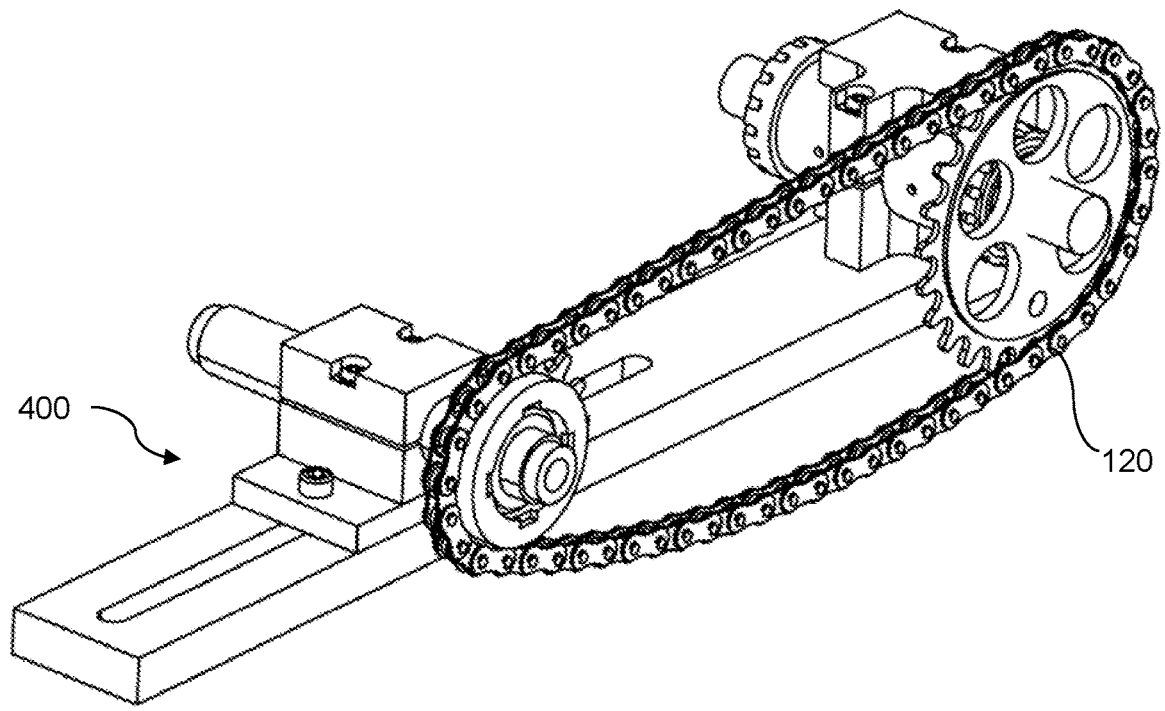
Figure 4I:
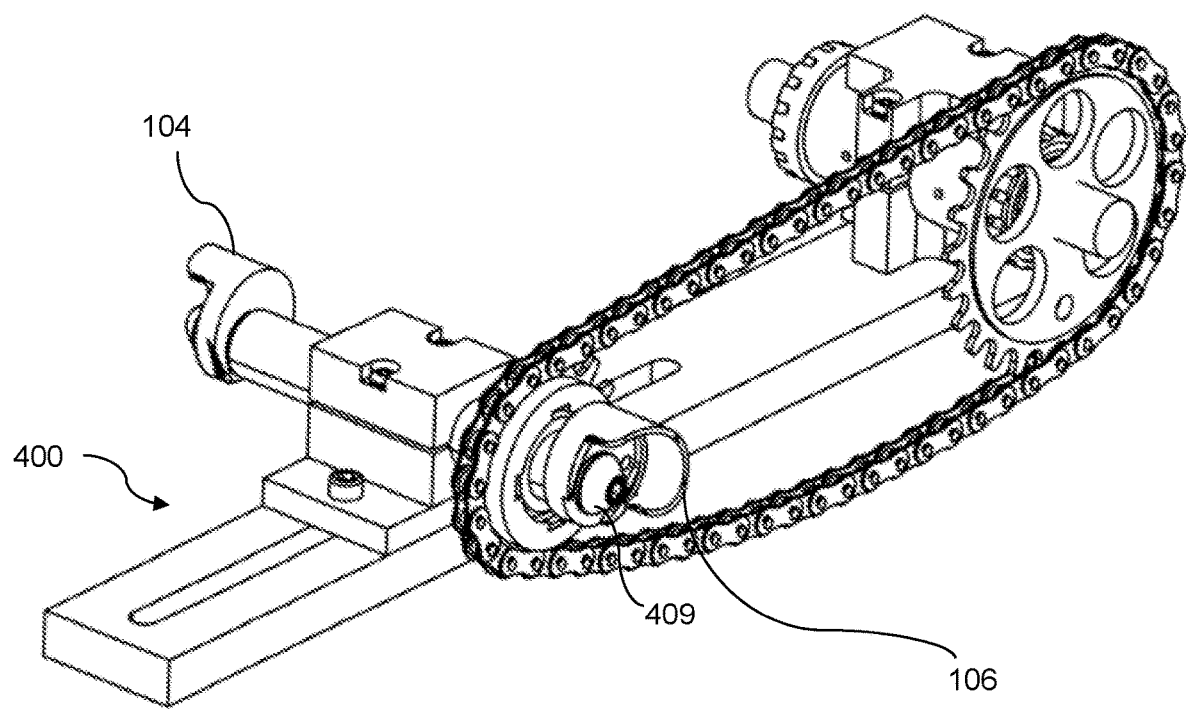
Figure 4J:
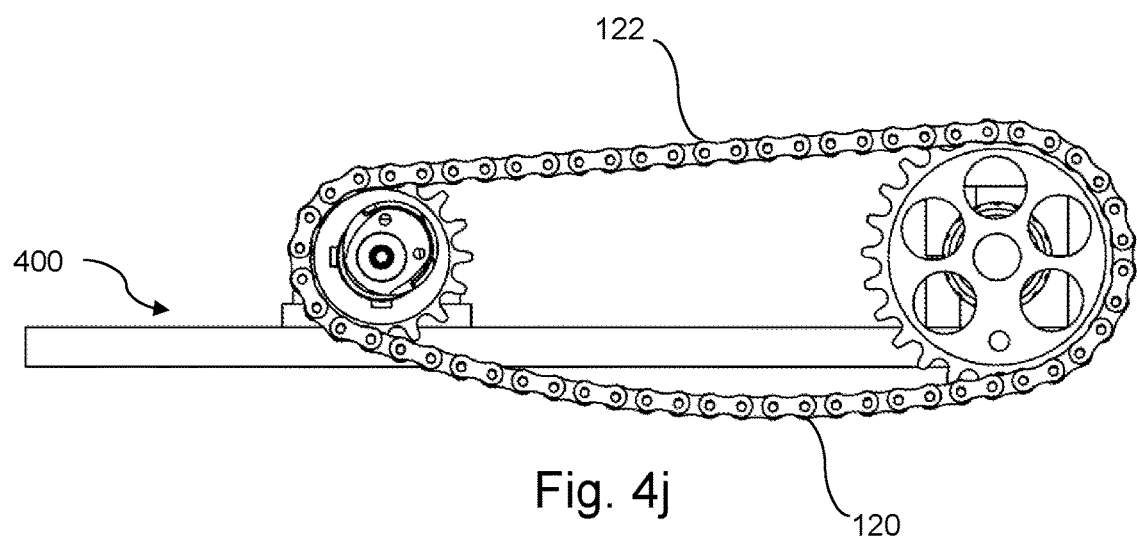
Figure 4K:
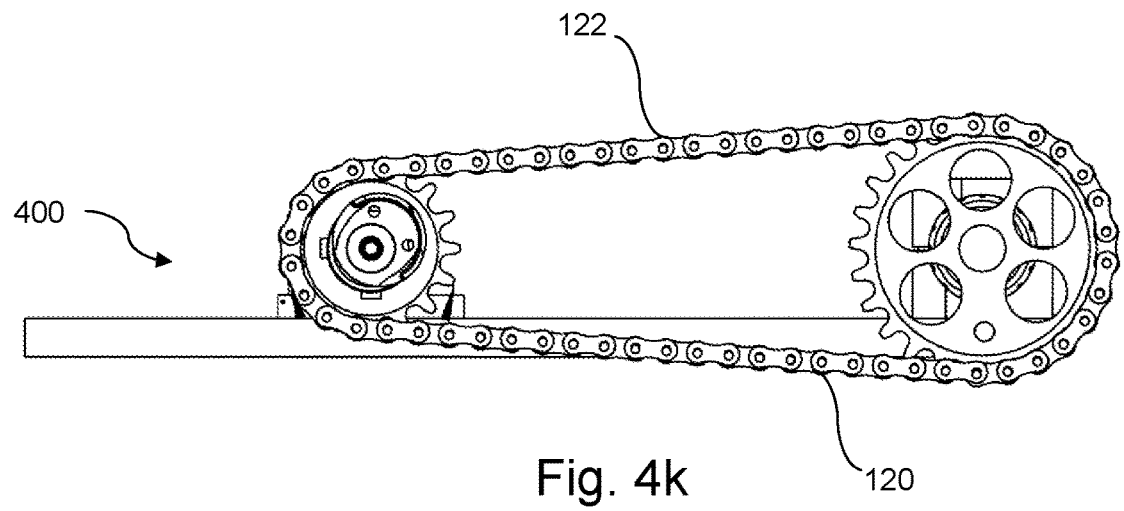
Figure 4L:
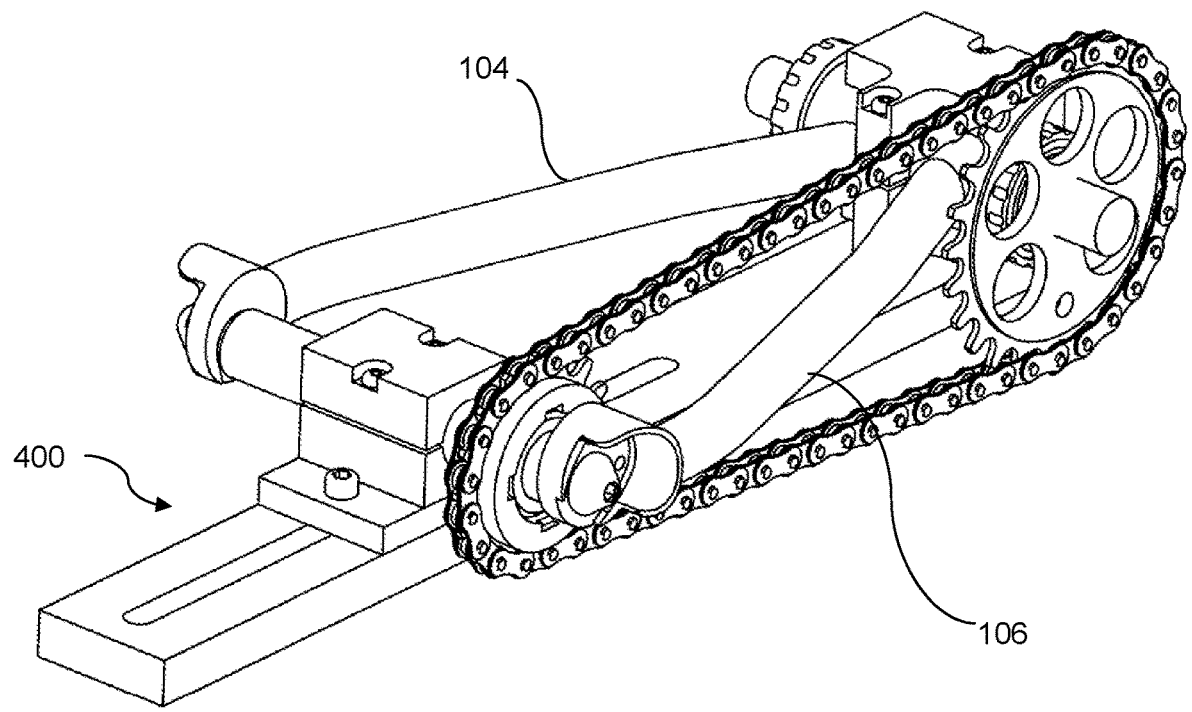
Figure 4M:
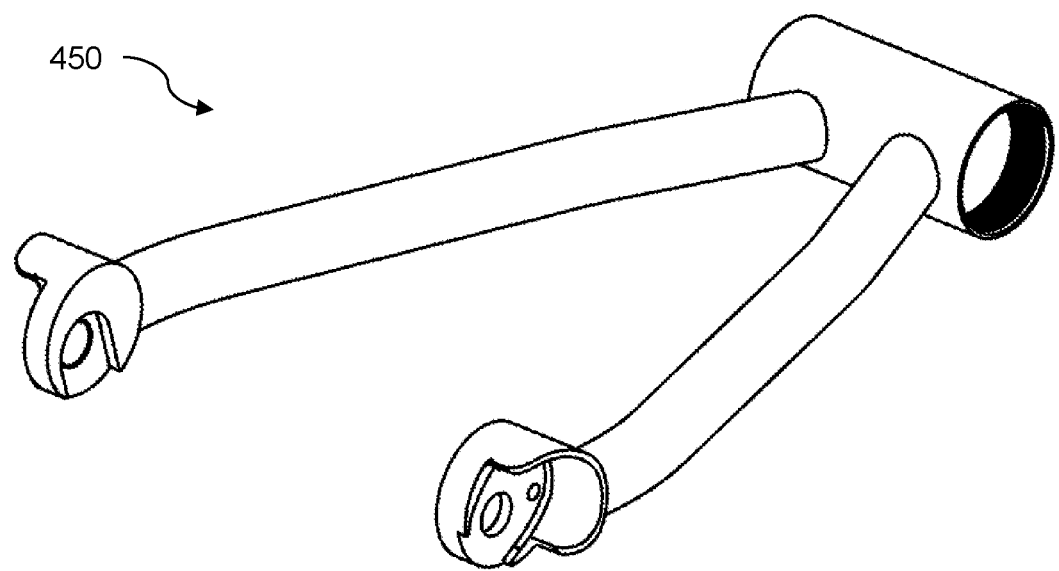
Figure 4N:
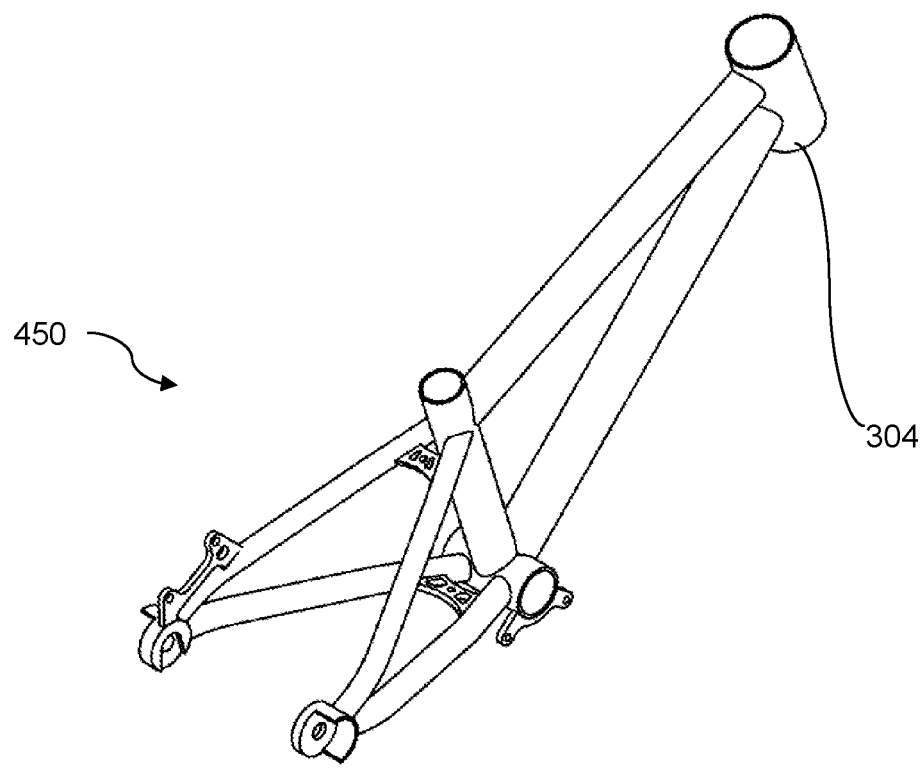

FIGS. 4a-4n show method steps of an exemplary process of manufacturing a bicycle frame. An ordinarily skilled artisan will appreciate that such steps can be followed, mutatis mutandis, to manufacture other chain or belt-driven vehicles.

By virtue of using exemplary manufacturing processes according to the present disclosure, identical or nearly identical drivetrain assemblies with identical or nearly identical chain or belt tensions or chainstay lengths can be produced. In exemplary embodiments, such drivetrain assemblies include a first drivetrain assembly and a second drivetrain assembly, and a slack of the chain or belt of the first drivetrain assembly is equal to a slack of the chain or belt of the second drivetrain assembly within a tolerance of +/−1 inch. In other exemplary embodiments, such drivetrain assemblies include a first drivetrain assembly and a second drivetrain assembly, and the chainstay length of the first drivetrain assembly is equal to the chainstay length of the second drivetrain assembly within a tolerance of +/−0.002 inch.

In an exemplary manufacturing process, as illustrated in FIG. 4a, a fixture 400 is provided, and includes a front mount 402 and a rear mount 404 for holding respective tubular elements. The fixture 400 is configured to selectively vary a distance between the front and rear mounts 402, 404. In an exemplary embodiment, the fixture 400 can include fixture slide hardware 4001 such as, for example, a slotted hole with a bolt for holding one or more of the mounts 402, 404 in position within the slotted hole. In an exemplary embodiment, the mounts 402, 404 can hold components between top and bottom portions 4002, 4003 held by bolts 4004. In another exemplary embodiment, the distance between the front and rear mounts 402, 404 can be adjusted using a lead screw or translation screw arrangement.

In an exemplary manufacturing process, as illustrated in FIG. 4b, a bottom bracket shell 102 is held by the front mount 402. For example, the bottom bracket shell 102 can be clamped by the front mount 402.

In an exemplary manufacturing process, as illustrated in FIG. 4c, bottom bracket bearings 406 are installed into the bottom bracket shell 102. The bottom bracket bearings 406 are configured to hold the bottom bracket axle in position.

In an exemplary manufacturing process, as illustrated in FIG. 4d, a fixture hub 408 is held by the rear mount 404. For example, the fixture hub 408 can be clamped by the front mount 402. The fixture hub 408 can help adjust the position of the rear axis relative to the front axis, and thus adjust the chain or belt tension, without requiring the presence of an actual wheel hub, which may not have an adequate clamping/mounting surface. Alternative, a wheel hub can be held by the rear mount 404. The fixture hub 408 can be used to hold the first and second dropouts 104, 106 at specific points and orientations in space relative to the bottom bracket shell 102 during a frame welding or bonding process. The fixture hub 408 can have equivalent critical dimensions as a rear bicycle hub to help ensure that the rear bicycle hub will properly fit during the bicycle assembly process. These critical dimensions include the distance between dropouts (if more than one dropout are present), dropout inner/axle diameter, and the chain or belt line (i.e., the distance from the center of the fixture hub in the main longitudinal direction to the rear sprocket/chain or belt line plane).

In an exemplary manufacturing process, as illustrated in FIG. 4e, a bottom bracket spindle 407 is installed into the bottom bracket bearings, so as to hold the bottom bracket axle in the front mount 402.

In an exemplary manufacturing process, as illustrated in FIG. 4f, a rear sprocket 116 is installed onto the fixture hub 408.

In an exemplary manufacturing process, as illustrated in FIG. 4g, a front sprocket 112 is installed onto the bottom bracket spindle 407.

In an exemplary manufacturing process, as illustrated in FIG. 4h, a chain or belt 120 is installed on the front sprocket 112 and the rear sprocket 116.

In an exemplary manufacturing process, as illustrated in FIG. 4i, first and second dropouts 104, 106 are installed onto the fixture hub 408, for example, using dropout screws 409.

In an exemplary manufacturing process, as illustrated in FIGS. 4j and 4k, the distance between the front and rear mounts 402, 404 is varied to vary the tension of the chain or belt 120 until a predetermined tension is reached. To determine whether a predetermined tension has been reached, the bottom section 122 can be pressed down and a maximum vertical displacement of the midpoint of the bottom section 122 can be measured and compared to a predetermined range. For example, a predetermined tension could be defined such that the midpoint of the bottom section 122 is vertically displaceable only by a maximum vertical extent with a range from 0.5 inches to 1 inch.

In an exemplary manufacturing process, the relative positions of the bottom bracket shell 102, the dropout 104, 106, and/or the chainstay member 108, 110 can be maintained using the fixture 400 alone in preparation for welding or bonding.

In an exemplary manufacturing process, as illustrated in FIG. 4l, once the predetermined tension has been reached, one or more chainstay members 108, 110 are positioned, are welded or bonded (directly or indirectly—i.e., to an intermediate piece) to the bottom bracket shell 102, and are respectively welded or bonded (directly or indirectly) to the first and second dropouts 104, 106. Alternatively, the one or more chainstay members 108, 110 are welded or bonded (directly or indirectly) to either the bottom bracket shell 102 or their respective dropout 104, 106 prior to adjusting the tension, and are welded or bonded (directly or indirectly) to the other of the bottom bracket shell 102 or their respective dropout 104, 106 after reaching the predetermined tension. It is noted that brazing is a type of bonding.

In an exemplary manufacturing process, as illustrated in FIG. 4m, the resulting frame chainstay assembly 450 comprising the chainstay members 104, 106 welded or bonded to the bottom bracket shell 102 and to the first and second dropouts 104, 106, is removed from the fixture 400.

In an exemplary manufacturing process, as illustrated in FIG. 4n, prior to, or after removing the frame chainstay assembly 450 from the fixture 400, the frame chainstay assembly 450 can be welded or bonded (directly or indirectly) to additional frame components, such as at least one tubular member 304.

In an exemplary manufacturing process, prior to, or after welding or bonding additional frame components, a wheel hub 124, a rear sprocket 116, a front sprocket 112 and a chain or belt 120 can be installed to create a drivetrain assembly 100 as shown in FIG. 1.

In an exemplary manufacturing process, prior to, or after forming the drivetrain assembly 100, additional components of a bicycle 300 can be coupled to the frame chainstay assembly 450 or drivetrain assembly 100, to produce a bicycle as shown in FIG. 3. For example, additional steps can include indirectly coupling a seat to the drivetrain assembly, and rotatably coupling a front set including a handlebar and a front wheel.

In an exemplary manufacturing process, after a bicycle frame or a portion of a bicycle frame has been welded or bonded, a mold can be made from the resulting frame or frame portion. This mold can be used to manufacture a composite frame or frame portion. Alternatively, the distance between the front mount and the rear mount can be measured after the predetermined tension has been reached. Subsequent frames or frame portions can then be manufactured by referring to this measured distance rather than measuring tension.

For example, in an exemplary manufacturing process, a first drivetrain assembly or bicycle frame is manufactured using the process illustrated in FIGS. 4a-4n, and a second drivetrain assembly or bicycle frame is manufactured from a mold taken of the first drivetrain assembly or bicycle, or parts thereof.

In an exemplary manufacturing process, by adjusting the chain or belt tension prior to welding or bonding all the components of the drivetrain assembly 100, the resulting drivetrain assembly 100 can achieve proper chain or belt tension without needing a tensioning mechanism after welding or bonding. The inventor of the present disclosure has found that, one reason that tensioning mechanisms are needed in conventional bicycles is that conventional manufacturing tolerances of bicycle chainstay lengths are in the order of about +/−1 mm. Yet, a variance of +/−1 mm creates significantly unpredictable chain or belt tensions. The chainstay length tolerance would need to be in the order of about +/−0.1 mm to achieve proper tension. Adjusting the chain or belt tension prior to welding or bonding the components allows for the chainstay length tolerance to be ignored, and instead allows focus to be given to the chain tension tolerance, which can be much larger (e.g., ×100) than the chainstay length tolerance. Resulting chain or belt tensions are thus much more predictable and controlled.

Furthermore, in an exemplary manufacturing process, as the chain or belt tension results solely from the geometry of the main components of the bicycle, fewer components are needed, thus reducing cost, complexity, and risk of mechanical failure.

It will be appreciated by those skilled in the art that the disclosure herein can be embodied in other specific forms without departing from the spirit or essential characteristics thereof. The presently-disclosed embodiments are therefore considered in all respects to be exemplary and not restricted. The scope of the invention is indicated by the appended claims rather than the foregoing description and all changes that come within the meaning and range and equivalence thereof are intended to be embraced therein.

What is claimed is:

1. A drivetrain assembly comprising:
a bottom bracket shell having a front through-hole defining a front axis;
at least one dropout having a rear through-hole defining a rear axis;
at least one chainstay member directly or indirectly attached to the at least one dropout and the bottom bracket shell;
a front sprocket rotatably coupled to the front through-hole;
a rear sprocket rotatably coupled to the rear through-hole; and
a chain or belt extending around and in contact with the front and rear sprockets, the chain or belt including a bottom section extending from a first contact point between the chain or belt and the front sprocket to a second contact point between the chain or belt and the rear sprocket,
wherein the at least one chainstay member fixes the at least one dropout relative to the bottom bracket shell, such that a chainstay length, which is the shortest distance from the front axis to the rear axis, is non-variable, and such that the chain or belt has a predetermined tension defined by a midpoint of the bottom section being vertically displaceable only by a maximum vertical extent within a predetermined range upon application of a predetermined load at the midpoint of the bottom section, and
wherein when the predetermined load is 2 pounds, the predetermined range is:
a range from 0.25" to 0.80" when the chainstay length is between 6" and 12"; and
a range from 0.50" to 1.50" when the chainstay length is between 12" and 24".

2. The drivetrain assembly of claim 1, wherein when the predetermined load is 2 pounds, the predetermined range is:
a range of 0.30" to 0.50" when the chainstay length is between 6" and 9";
a range of 0.40" to 0.75" when the chainstay length is between 9" and 12";
a range of 0.60" to 1.00" when the chainstay length is between 12" and 18"; and
a range of 0.90" to 1.40" when the chainstay length is between 18" and 24".

3. The drivetrain assembly of claim 1, further comprising a wheel hub,
wherein opposite sides of the wheel hub respectively contact the at least one dropout, and
wherein the at least one dropout is an integral component.

4. The drivetrain assembly of claim 1, wherein the bottom bracket shell, the first and second chainstay members, and the first and second dropouts are each integrally formed.

5. The drivetrain assembly of claim 4, wherein the bottom bracket shell, the first and second chainstay members, and the first and second dropouts are molded from a composite material, or are 3D printed.

6. The drivetrain assembly of claim 1, wherein the chain or belt has the predetermined tension while contacting only the front and rear sprockets, and a distance between the front axis and the rear axis is nonadjustable.

7. A bicycle comprising:
the drivetrain assembly of claim 1.

8. The bicycle of claim 7, further comprising:
a seat;
at least one tubular member coupled to the drivetrain assembly; and
a front set rotatably coupled to the at least one tubular member and including a handlebar and a front wheel.

9. A bicycle comprising:
a drivetrain assembly comprising:
a bottom bracket shell having a front through-hole defining a front axis;
at least one dropout having a rear through-hole defining a rear axis;
at least one chainstay member directly or indirectly attached to the at least one dropout and the bottom bracket shell;
a front sprocket rotatably coupled to the front through-hole;
a rear sprocket rotatably coupled to the rear through-hole; and
a chain or belt extending around and in contact with the front and rear sprockets, the chain or belt including a bottom section extending from a first contact point between the chain or belt and the front sprocket to a second contact point between the chain or belt and the rear sprocket,
wherein the at least one chainstay member fixes the at least one dropout relative to the bottom bracket shell, such that a chainstay length, which is the shortest distance from the front axis to the rear axis, is non-variable, and such that the chain or belt has a predetermined tension defined by a midpoint of the bottom section being vertically displaceable only by a maximum vertical extent within a predetermined range upon application of a predetermined load at the midpoint of the bottom section, and
wherein the bicycle is a single-speed bicycle lacking a chain or belt tensioner.

10. A bicycle comprising:
a drivetrain assembly comprising:
a bottom bracket shell having a front through-hole defining a front axis;
at least one dropout having a rear through-hole defining a rear axis;
at least one chainstay member directly or indirectly attached to the at least one dropout and the bottom bracket shell;
a front sprocket rotatably coupled to the front through-hole;
a rear sprocket rotatably coupled to the rear through-hole; and
a chain or belt extending around and in contact with the front and rear sprockets, the chain or belt including a bottom section extending from a first contact point between the chain or belt and the front sprocket to a second contact point between the chain or belt and the rear sprocket, wherein the at least one chainstay member fixes the at least one dropout relative to the bottom bracket shell, such that a chainstay length, which is the shortest distance from the front axis to the rear axis, is non-variable, and such that the chain or belt has a predetermined tension defined by a midpoint of the bottom section being vertically displaceable only by a maximum vertical extent within a predetermined range upon application of a predetermined load at the midpoint of the bottom section, and wherein the bicycle is an internally geared bicycle lacking a chain or belt tensioner.

11. A set comprising two drivetrain assemblies, the two drivetrain assemblies including a first drivetrain assembly and a second drivetrain assembly, each of the first and second drivetrain assemblies comprising:
   a bottom bracket shell having a front through-hole defining a front axis;
   at least one dropout having a rear through-hole defining a rear axis;
   at least one chainstay member directly or indirectly attached to the at least one dropout and the bottom bracket shell;
   a front sprocket rotatably coupled to the front through-hole;
   a rear sprocket rotatably coupled to the rear through-hole; and
   a chain or belt extending around and in contact with the front and rear sprockets, the chain or belt including a bottom section extending from a first contact point between the chain or belt and the front sprocket to a second contact point between the chain or belt and the rear sprocket, wherein the at least one chainstay member fixes the at least one dropout relative to the bottom bracket shell, such that a chainstay length, which is the shortest distance from the front axis to the rear axis, is non-variable, and such that the chain or belt has a predetermined tension defined by a midpoint of the bottom section being vertically displaceable only by a maximum vertical extent within a predetermined range upon application of a predetermined load at the midpoint of the bottom section, and wherein a slack of the chain or belt of the first drivetrain assembly is equal to a slack of the chain or belt of the second drivetrain assembly within a tolerance of +/−1".

12. A set comprising two drivetrain assemblies, the two drivetrain assemblies including a first drivetrain assembly and a second drivetrain assembly, each of the first and second drivetrain assemblies comprising:
   a bottom bracket shell having a front through-hole defining a front axis;
   at least one dropout having a rear through-hole defining a rear axis;
   at least one chainstay member directly or indirectly attached to the at least one dropout and the bottom bracket shell;
   a front sprocket rotatably coupled to the front through-hole;
   a rear sprocket rotatably coupled to the rear through-hole; and
   a chain or belt extending around and in contact with the front and rear sprockets, the chain or belt including a bottom section extending from a first contact point between the chain or belt and the front sprocket to a second contact point between the chain or belt and the rear sprocket, wherein the at least one chainstay member fixes the at least one dropout relative to the bottom bracket shell, such that a chainstay length, which is the shortest distance from the front axis to the rear axis, is non-variable, and such that the chain or belt has a predetermined tension defined by a midpoint of the bottom section being vertically displaceable only by a maximum vertical extent within a predetermined range upon application of a predetermined load at the midpoint of the bottom section, and wherein the chainstay length of the first drivetrain assembly is equal to the chainstay length of the second drivetrain assembly within a tolerance of +/−0.002".

13. A process of manufacturing a drivetrain assembly, comprising:
   arranging a bottom bracket shell having a front through-hole defining a first axis, at least one dropout having a rear through-hole defining a rear axis, and at least one chainstay member, relative to one another, a chainstay length being defined as the shortest distance from the front axis to the rear axis;
   rotatably coupling a front sprocket to the front through-hole;
   rotatably coupling a rear sprocket to the rear through-hole;
   disposing a chain or belt around and in contact with the front and rear sprockets;
   adjusting a relative position of the bottom bracket shell, the at least one dropout, and the at least one chainstay member, with respect to one another, to reach a predetermined tension of the chain or belt; and
   after the predetermined tension of the chain or belt is reached, welding or bonding, directly or indirectly, the at least one chainstay member to the bottom bracket shell and/or to the at least one dropout, to fix the chainstay length.

14. The process of claim 13,
   wherein the arranging includes, using a fixture comprising a front mount and a rear mount and configured to selectively vary a distance between the front and rear mounts, holding the bottom bracket shell by the front mount and holding a hub by the rear mount, the hub being rotatably coupled to the rear through-hole, and
   wherein the adjusting includes selectively varying the distance between the front and rear mounts until the predetermined tension of the chain or belt is reached.

15. The process of claim 13,
   wherein the chain or belt includes a top or bottom section extending from a first contact point between the chain or belt and the front sprocket to a second contact point between the chain or belt and the rear sprocket, and
   wherein the adjusting includes vertically displacing a portion of the chain or belt at the midpoint of the top or bottom section, using a predetermined load, by a predetermined vertical extent.

16. The process of claim 15, wherein when the predetermined load is 2 pounds, the predetermined vertical extent is within:
   a range from 0.25" to 0.80" when the chainstay length is between 6" and 12"; and
   a range from 0.50" to 1.50" when the chainstay length is between 12" and 24".

17. The process of claim 15, wherein when the predetermined load is 2 pounds, the predetermined vertical extent is within:
- a range of 0.30" to 0.50" when the chainstay length is between 6" and 9";
- a range of 0.40" to 0.75" when the chainstay length is between 9" and 12";
- a range of 0.60" to 1.00" when the chainstay length is between 12" and 18"; and
- a range of 0.90" to 1.40" when the chainstay length is between 18" and 24".

18. A process of manufacturing a bicycle, comprising:

manufacturing a drivetrain assembly using the process of claim 13;

coupling a seat to the drivetrain assembly;

coupling at least one tubular member to the drivetrain assembly; and rotatably coupling a front set to the at least one tubular member, the front set including a handlebar and a front wheel.

19. The drivetrain assembly manufactured using the process of claim 13.

\* \* \* \* \*